July 28, 1942.                    W. H. RYAN                    2,291,347
                                  LIGHT FILTER
                              Filed July 18, 1941
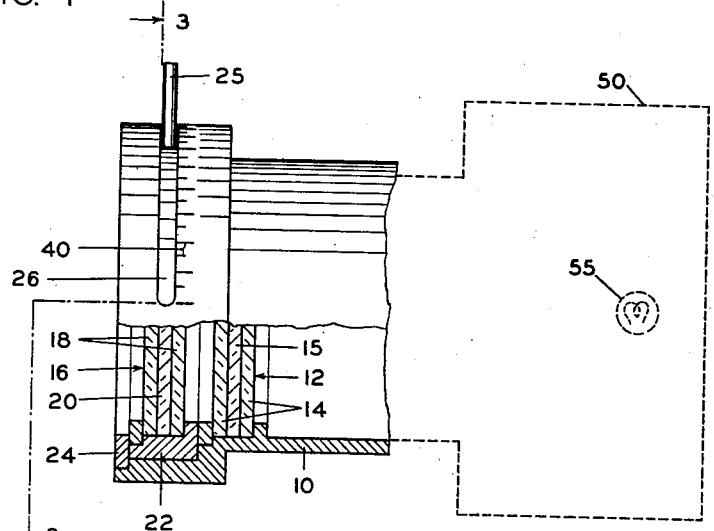
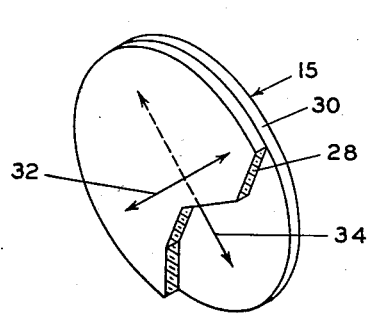
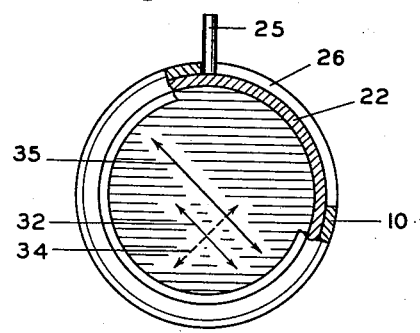
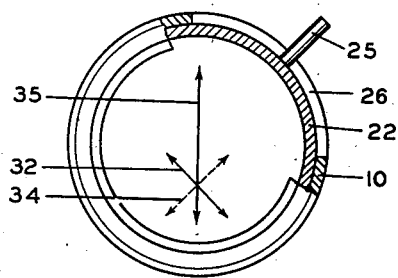
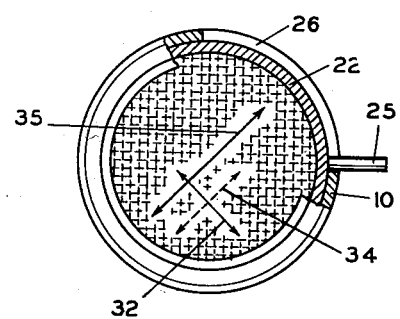
INVENTOR.
William H. Ryan
BY
Donald L. Brown Patented July 28, 1942

2,291,347

UNITED STATES PATENT OFFICE 2,291,347

LIGHT FILTER

William H. Ryan, Cambridge, Mass., assignor to Polaroid Corporation, Dover, Del., a corporation of Delaware Application July 18, 1941, Serial No. 402,934

4 Claims. (Cl. 88—24)

This invention relates to light filters, and more particularly to polarizing light filters for controlling the degree of contrast in photographic images.

There is commercially available photographic paper sensitive to light of a relatively wide wavelength band but with which the gamma of a photographic image produced thereon varies, depending upon the predominant wavelength band of the light used for printing thereon. Such paper may, for example, give an image of relatively high contrast when printed on by means of light of one wavelength band, for example the blue-violet, and an image of relatively low contrast when printed on with light of another wavelength band, for example yellow or green. With such papers intermediate degrees of contrast may be obtained by printing with light of both wavelength bands and varying the ratio of exposure to light of one band to exposure to light of the other band. Photographic paper of the above type is generally known as "multi-contrast" or "multi-grade" paper, and an example thereof is that sold under the trade name "Varigam." In conventional practice the degree of contrast obtained may be controlled by printing in two stages, using different filters for each stage. For example, if the paper gives a contrasty image when exposed to blue light and a flat image when exposed to yellow light, a blue filter may be used during one stage of printing and a yellow filter during the other. The desired degree of contrast is obtained by varying the relative time of exposure through each filter, which is a rather tedious process. Another method of control is to have a series of filters each of which transmits different proportions of the effective wavelength bands, and to choose one from the series which will give the desired degree of contrast for a particular picture.

It is a particular object of this invention to provide variable color filter means particularly adapted for use with multi-contrast photographic paper, wherewith it is possible to obtain any desired degree of contrast in the finished image by simple adjustment within the filter.

Another object of the invention is to provide such a filter wherewith the desired results are obtained by means of suitably chosen and combined light-polarizing elements.

Other objects and advantages will in part appear and in part be pointed out in the course of the following description of one embodiment of the invention which is given as a non-limiting example in connection with the accompanying drawing, in which:

Figure 1 is a view partly in elevation and partly in section showing a variable color light filter embodying a form of the invention;

Figure 2 is a perspective view partly broken away showing one of the light-polarizing elements used in the filter shown in Fig. 1; and Figures 3, 4 and 5 are sections on the line 3—3 in Fig. 1, illustrating somewhat diagrammatically the operation of the filter shown in Fig. 1.

Referring to Fig. 1, barrel 10 may be fitted in any suitable way for attachment to a photographic enlarger or contact printer, such as is indicated diagrammatically at 50 and includes a conventional light source 55. Mounted within barrel 10 and preferably fixedly positioned therein is a filter element 12 comprising a light-polarizing layer 15 which may be laminated, as shown, between protective disks 14 of glass or other transparent plastic. Layer 15 comprises polarizing material of special characteristics which will be described in more detail hereinafter in connection with Fig. 2.

Mounted in substantially parallel relation with element 12 is a second polarizing filter element 16, which may comprise, as shown, a central layer 20 laminated between protective layers 18 of glass or other transparent plastic. Layer 20 preferably comprises neutral polarizing material adapted to polarize uniformly substantially all visible light, and suitable materials for this purpose include polarizing films or sheets sold under the trade name "Polaroid." Element 16 is preferably mounted for rotation with respect to element 12, as for example by means of rim 22 rotatably mounted within barrel 10 and locked therein by threaded collar 24. There may also be provided suitable means for controlling the rotation of element 16, such as pin 25 threaded into rim 22 and passing through slot 26 in barrel 10. As shown in Figs. 3–5, slot 26 is preferably of just sufficient length to permit a 90° rotation of element 16.

In accordance with the practice of the invention, polarizing layer 15 preferably possesses such polarizing properties that it acts to absorb one component of light of a predetermined wavelength band or color and the other component, that is to say the light vibrating at right angles to the first named component, of light, of a different predetermined wavelength band or color. For example, if a beam of white light is incident thereon, layer 15 may absorb vertically vibrating light in one band of the spectrum, for example the yellow, and horizontally vibrating light in another band of the spectrum, for example the blue. It follows in this example that if such a polarizer is combined with a neutral polarizer having its transmission axis vertical, the light transmitted by the combined polarizers will be predominantly blue, and if either polarizer is rotated through 90°, the light transmitted will then be predominantly yellow.

Polarizing elements having such properties may be formed in a variety of ways. For example, referring to Fig. 2, layer 15 is shown as comprising a pair of component layers 28 and 30, which are each polarizers for different, predetermined wavelength bands. For example, layer 28 may be adapted to polarize light in the blue band of the spectrum and transmit light in other wavelength bands in substantially unpolarized condition, and layer 30 may be adapted to polarize light in the yellow band of the spectrum and to transmit other light in substantially unpolarized condition. The transmission axes of layers 28 and 30 are represented as being parallel respectively to arrows 32 and 34, and the two layers are preferably assembled in such manner that their transmission axes are substantially at right angles to each other.

Layers 28 and 30 may be formed of a variety of materials such, for example, as films or sheets of suitably dyed or stained plastic. Preferred materials for this purpose comprise plastics of the class consisting of the transparent, hydrophilic, linear high polymers, and examples thereof include polyvinyl alcohol, polyvinyl acetal and regenerated cellulose. Particularly good results have been obtained with polyvinyl alcohol, and layers 28 and 30 may advantageously comprise sheets of this material which have had the molecules therein oriented to substantial parallelism and the oriented portions of which have incorporated therein a dichroic dye or dyes of the desired color. Such dyes are preferably chosen with a view to their ability to show high dichroism for a relatively narrow wavelength band, and the dye used in one sheet will preferably be of such a color that it shows relatively little or no absorption for light of the wavelength band absorbed by the dye used in the other said layer.

The term "dichroism" is used herein as meaning the property of differential absorption of the components of an incident beam of light, depending upon the vibration directions of said components. By "dichroic" dye or stain is meant a dye or stain whose molecules possess the property of showing dichroism. In the practice of the present invention, this property is displayed when said dyes are incorporated in molecularly oriented plastic materials, in that the resulting stained areas show dichroism.

One type of variable contrast photographic paper of the class referred to above is sensitized to light ranging from blue through green, and for use with that type of paper a preferred combination of colors in polarizer 15 is blue and yellow or green. Yellow may be used instead of green, both because it transmits a relatively wide band of green light and because this type of paper is usually insensitive to red light present in the yellow. For example, layer 30 may comprise a sheet of polyvinyl alcohol which has been cast from a solution containing a suitable dichroic blue dye such as Niagara Sky Blue 6B. Layer 28 may similarly comprise a sheet of polyvinyl alcohol cast from a solution to which has been added a dichroic yellow dye such, for example, as Solantine Yellow FF or Stilbene Yellow 3GA. Sheets prepared in this manner appear to show the best dichroism when the molecules therein are substantially uniformly oriented, as for example by stretching the sheet to six or seven times its cast length, although satisfactory results have been obtained with sheets which have been stretched as little as one and one-half or two times their cast length. The stretched sheets may then be assembled in superimposed relation with their respective directions of molecular orientation at right angles to each other, and they may be laminated together by any suitable adhesive such as a solution of polyvinyl alcohol.

In considering the operation of the polarizer prepared as described above, it should be borne in mind that yellow layer 28 is actually a polarizer for light in the blue band of the spectrum, by reason of the fact that it absorbs one component of the blue light but transmits both components throughout the remainder of the spectrum. Similarly, blue layer 30 is primarily a polarizer for light in the yellow band of the spectrum, inasmuch as its density for the absorbed component is highest in the yellow band.

Figs. 3–5 illustrate somewhat diagrammatically the operation of the filter of the invention. In these figures arrow 35 represents the transmission axis of neutral polarizer 20, and arrows 32 and 34 represent the directions of the transmission axes of yellow and blue polarizers 28 and 30, respectively. It will be noted that the three polarizers are preferably so positioned with respect to each other and to slot 26 that when pin 25 is at either end of said slot, the transmission axis of polarizer 20 will be respectively parallel with and perpendicular to the transmission axes of the color polarizers.

In Fig. 3, element 16 is shown as having been rotated within barrel 10 to a position wherein pin 25 is at one end of slot 26. In this position it will be seen that arrow 35 is substantially parallel with arrow 32 and therefore perpendicular to arrow 34.

The light transmitted to polarizer 20 by polarizer 15 comprises predominantly yellow light vibrating parallel to arrow 34 and predominantly blue light vibrating parallel to arrow 32, the yellow light vibrating parallel to arrow 32 having been absorbed by blue polarizer 30 and the blue light vibrating parallel to arrow 34 having been absorbed by yellow polarizer 28.

Inasmuch as the yellow component of the light incident on polarizer 20 is vibrating at right angles to arrow 35, it is absorbed in said polarizer. The blue component, however, is vibrating parallel to the transmission axis of polarizer 20 and is accordingly freely transmitted thereby. It follows, therefore, that in this relative position of the polarizers the light transmitted is predominantly blue, as is indicated by the shading in Fig. 3.

In Fig. 4, element 16 is shown as having been rotated within barrel 10 until pin 25 is substantially equidistant from the ends of slot 26. In this position the transmission axis of polarizer 20 is at angles of substantially 45° with the transmission axes of the yellow and blue polarizers, as is indicated by the relative positioning of arrows 32, 34 and 35. Polarizer 20 will therefore absorb approximately equal amounts of both the yellow and blue components transmitted to it by polarizer 15, but will transmit the remainder.

In Fig. 5, element 16 is shown as having been rotated within barrel 10 until pin 25 is at the opposite end of slot 26 from the position shown in Fig. 3. In this position arrow 35 is substantially parallel with arrow 34 and therefore perpendicular to arrow 32. The converse of the operation shown in Fig. 3 will therefore take place. The blue component of the light transmitted by polarizer 15 will be absorbed by polarizer 20, but the predominantly yellow components will be freely transmitted by polarizer 20, as is indicated by the shading in Fig. 5.

It will be apparent from the foregoing that the relative positioning of polarizers 20 and 15 may be varied at will to produce any desired proportion of yellow and blue in the light transmitted by the filter.

An important advantage of this filter is that the effective intensity of the light transmitted is substantially the same in all position. This is true in spite of the fact that in the position shown in Fig. 5 a substantial amount of red light is transmitted, for the reason that the photographic paper for which this filter is particularly useful is usually substantially insensitive to red. It follows, therefore, that a simple scale of contrast values may easily be evolved corresponding to various proportions of blue and yellow light and the edge of slot 26 may be graduated in conformity therewith, as indicated at 40 in Fig. 1. With this arrangement, it is necessary only to establish first the proper exposure time, and the filter may then be set to the position wherein it will automatically produce the desired contrast in the finished print.

It will be obvious that numerous changes may be made in the construction of the above described filter without departing from the scope of the invention. For example, the relative positioning of the two polarizers may be reversed so that element 12 is rotatable with respect to a fixedly positioned neural polarizer. Alternatively, both polarizers if desired may be rotatable within barrel 10. Furthermore, polarizers for colors other than the yellow and blue described above may be substituted herein without changing any essential of the invention. It will be apparent also that substantially the same results will be obtained if polarizers 15 and 20 are manipulated by hand without having them mounted as in Fig. 1, and that such modified ways of practicing the invention are also to be construed as coming within the scope thereof.

In the foregoing description, polarizers 28 and 30 are described as being cast from the solution to which the desired dye has been added. It is to be understood, however, that the dye may be incorporated into the sheet in a variety of other methods. For example, a preformed sheet may be imbibed in a solution of the desired dye, and the orientation operation may take place either before or after the dyeing step. Alternatively, the dye may be applied to the oriented surface of a sheet of the desired plastic by saturating a suitable matrix with the dye solution and pressing it into contact with the oriented surface of the sheet. Various other ways of producing the desired result will doubtless be apparent to those skilled in the art.

Heretofore, element 15 has been described as being in laminated form, but this is not an essential limitation. It may, for example, comprise a pair of separate polarizers 28 and 30 fixed in position within barrel 10 with their respective transmission axes relatively perpendicular. Alternatively, element 15 may comprise a single sheet of material such as polyvinyl alcohol which has the molecules on each surface oriented to substantial parallelism but in directions at right angles to each other. With a sheet so oriented, it is possible to dye one side one color, for example yellow, and the other side another color, for example blue, and the resulting product will be found substantially identical in operation and polarizing properties with laminated polarizer 15. It should be pointed out that in all these modifications it is essential only that the portions of the plastic penetrated by the dyes should have the molecules therein oriented, and it is of no importance whether or not the molecules of unstained portions of the sheet be oriented. It is to be understood, therefore, that whenever the products of the invention are specified in the following claims as being substantially oriented, this term is to be interpreted as meaning that at least the dyed portions thereof are oriented.

Although the operation of the invention has been described in connection with multi-contrast photographic "paper," it is to be understood that the term "paper" is intended to include any similar photosensitive material such as photographic films or plates.

Since certain changes may be made in the above article and different embodiments of the invention could be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. Apparatus for printing on multi-contrast photographic paper, comprising, in combination, a light source and means for controlling the degree of contrast in the image produced on said paper, said means comprising, in combination, a light-polarizing element adapted to polarize light of a predetermined wavelength band less than the visible spectrum, said band comprising light which produces an image of maximum contrast on said paper, a second light-polarizing element adapted to polarize light of a predetermined wavelength band less than the visible spectrum and different from the band polarized by said first named element, said second named band comprising light which produces an image of minimum contrast on said paper, means for mounting said elements in substantially parallel and superimposed relation in the path of light from said source with their respective transmission axes relatively perpendicular, a third polarizing element adapted to polarize substantially uniformly substantially all visible light, means for mounting said third polarizing element substantially overlying and parallel with said first named polarizing elements, and means for producing relative rotation between said third polarizing element and said first polarizing elements.

2. Apparatus for printing on multi-contrast photographic paper, comprising, in combination, a light source and means for controlling the degree of contrast in the image produced on said paper, said means comprising, in combination, a light-polarizing element adapted to polarize substantially uniformly substantially all visible light, a second light-polarizing element adapted to absorb one component of light of a predetermined wavelength band and the component vibrating at right angles thereto of light of a different predetermined wavelength band, said wavelength bands comprising respectively light which produces an image of maximum contrast on said paper and light which produces an image of minimum contrast on said paper, means for rotatably mounting one of said polarizing elements substantially overlying and parallel with the other said element in the path of light from said source, and means for rotating said rotatably mounted element with respect to the other said element.

3. In combination with apparatus for printing upon multi-contrast photographic paper, means for controlling the degree of contrast in the image produced on said paper, said means comprising, in combination, a light-polarizing element adapted to polarize substantially uniformly substantially all visible light, a second light-polarizing element adapted to absorb one component of light of a predetermined wavelength band and the component vibrating at right angles thereto of light of a different predetermined wavelength band, said wavelength bands comprising respectively light which produces an image of maximum contrast on said paper and light which produces an image of minimum contrast on said paper, means providing a common mounting for said polarizing elements, at least one of said elements being mounted for rotation therein with respect to the other of said elements, means for positioning said mounting means with said polarizing elements in the path of light used for printing on said paper, and means for rotating said rotatably mounted element.

4. Apparatus for printing on multi-contrast photographic paper, comprising, in combination, a light source and means for controlling the degree of contrast in the image produced on said paper, said means comprising, in combination, a light-polarizing element adapted to polarize substantially uniformly substantially all visible light, a second light-polarizing element adapted to absorb one component of light of a predetermined wavelength band and the component vibrating at right angles thereto of light of a different predetermined wavelength band, said wavelength bands comprising respectively light which produces an image of maximum contrast on said paper and light which produces an image of minimum contrast on said paper, means providing a common mounting for said polarizing elements in the path of light from said source, said elements being mounted in substantially parallel relation and at least one thereof being rotatable in said mounting with respect to the other, and scale means on said mounting means adapted to cooperate with said rotatably mounted polarizing element to indicate a predetermined degree of contrast in an image reproduced on said paper.

WILLIAM H. RYAN.